United States Patent
Gaikwad et al.

(10) Patent No.: US 11,798,156 B2
(45) Date of Patent: Oct. 24, 2023

(54) HYPERCONVERGED CONFIGURATION TROUBLESHOOTING

(71) Applicant: International Business Machines Corporation, Armonk, NY (US)

(72) Inventors: Sneha Arunkumar Gaikwad, San Jose, CA (US); Cynthia Diaz, Los Angeles, CA (US); Shalini Gundaiah Ramamurthy, Fremont, CA (US); Sahil Bhadreshkumar Shah, San Jose, CA (US); Debbani Kundu Naskar, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 16/831,427

(22) Filed: Mar. 26, 2020

(65) Prior Publication Data

US 2021/0304381 A1 Sep. 30, 2021

(51) Int. Cl.
*G06T 7/00* (2017.01)
*G06N 20/00* (2019.01)
*G06K 19/06* (2006.01)
*G06Q 30/0601* (2023.01)
*G06N 5/04* (2023.01)

(52) U.S. Cl.
CPC ........ *G06T 7/001* (2013.01); *G06K 19/06028* (2013.01); *G06N 5/04* (2013.01); *G06N 20/00* (2019.01); *G06Q 30/0601* (2013.01); *G06T 2207/30164* (2013.01)

(58) Field of Classification Search
None
See application file for complete search history.

(56) References Cited

U.S. PATENT DOCUMENTS

| | | | |
|---|---|---|---|
| 6,389,359 B1 | 5/2002 | Potter | |
| 8,094,020 B2 | 1/2012 | Groth | |
| 9,097,528 B2 | 8/2015 | Rider | |
| 10,051,041 B2 * | 8/2018 | Reddy | G06F 9/4408 |

(Continued)

FOREIGN PATENT DOCUMENTS

| | | |
|---|---|---|
| CN | 104219074 A | 12/2014 |
| CN | 109214251 A | 1/2019 |

OTHER PUBLICATIONS

Improving Datacenter Operations Management Using Wireless Sensor Networks to Garefalakis et al. (Year: 2012).*

(Continued)

*Primary Examiner* — Delomia L Gilliard
(74) *Attorney, Agent, or Firm* — Van Leeuwen & Van Leeuwen; Edward J. Wixted (57) ABSTRACT

An approach is provided in which the approach captures an image of a component rack that includes a set of hardware components that are part of a hyperconverged system. The approach discovers the set of hardware components on a computer network during a domain-specific discovery process, and verifies that each one of the set of hardware components captured in the image matches one of the discovered set of hardware components. The approach monitors a status of the set of hardware components in response to verifying that each one of the set of hardware components captured in the image matches one of the discovered set of hardware components.

17 Claims, 10 Drawing Sheets

(56) References Cited

U.S. PATENT DOCUMENTS

| | | |
|---|---|---|
| 10,430,655 B2 | 10/2019 | Komatsu |
| 10,447,974 B2 | 10/2019 | Li |
| 10,896,266 B1* | 1/2021 | BeSerra ................ H04L 63/062 |
| 11,010,233 B1* | 5/2021 | Golden ................ G06F 21/554 |
| 11,356,443 B2* | 6/2022 | Soundararajan .... H04L 63/0815 |
| 11,561,878 B2* | 1/2023 | Sakthivel ............. G06F 11/302 |
| 2012/0249588 A1 | 10/2012 | Tison |
| 2015/0193325 A1* | 7/2015 | Harsan-Farr .......... G06F 11/008 |
| | | 702/186 |
| 2016/0014073 A1* | 1/2016 | Reddy .................... H04L 43/16 |
| | | 713/2 |
| 2017/0046233 A1 | 2/2017 | Shivanna |
| 2017/0076126 A1* | 3/2017 | Ashok ..................... G06F 16/00 |
| 2017/0115983 A1* | 4/2017 | Brech ..................... H04L 67/34 |
| 2018/0262722 A1* | 9/2018 | Li ....................... H04L 41/0889 |
| 2019/0026175 A1 | 1/2019 | Shelke |
| 2019/0097896 A1 | 3/2019 | Kritzler |
| 2019/0372861 A1 | 12/2019 | Roy |
| 2019/0379576 A1 | 12/2019 | Narnakaje Venugopala et al. |
| 2020/0007408 A1 | 1/2020 | Siddappa |
| 2020/0387127 A1* | 12/2020 | McGill .............. G05B 19/0423 |
| 2021/0035358 A1* | 2/2021 | King ....................... G06T 17/05 |
| 2021/0143999 A1* | 5/2021 | Nirwal .................. H04L 9/0894 |
| 2021/0328877 A1* | 10/2021 | Jung ....................... H04L 41/12 |
| 2022/0027472 A1* | 1/2022 | Golden ................. G06F 3/0619 |
| 2022/0197625 A1* | 6/2022 | Franchitti ........... G06F 16/9538 |

OTHER PUBLICATIONS

"Datacenter Clarity LC creates smart solutions," Siemens Industry, Inc., Oct. 2017, 2 pages.

* cited by examiner

HYPERCONVERGED CONFIGURATION TROUBLESHOOTING

BACKGROUND

Hyperconverged systems are software-defined systems that virtualize elements of conventional "hardware-defined" systems. A hyperconverged system typically includes virtualized computing (a hypervisor), a virtual storage area network (VSAN) (software-defined storage), virtualized networking (software-defined networking), and runs on commercial off-the-shelf servers.

Unlike a converged system, which has components serially located in the same or consecutive racks, hyperconverged systems are expandable and result in many components physically located at disparate locations. When working with hyperconverged systems, system administrators monitor and maintain multiple hardware components installed on different racks and on different floors within a data center, which can become cumbersome when locating specific components requiring maintenance. Even within one rack, system administrators must identify a specific component on the rack requiring service so as to not disrupt other components.

BRIEF SUMMARY

According to one embodiment of the present disclosure, an approach is provided in which the approach captures an image of a component rack that includes a set of hardware components that are part of a hyperconverged system. The approach discovers the set of hardware components on a computer network during a domain-specific discovery process, and verifies that each one of the set of hardware components captured in the image matches one of the discovered set of hardware components. The approach monitors a status of the set of hardware components in response to verifying that each one of the set of hardware components captured in the image matches one of the discovered set of hardware components.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
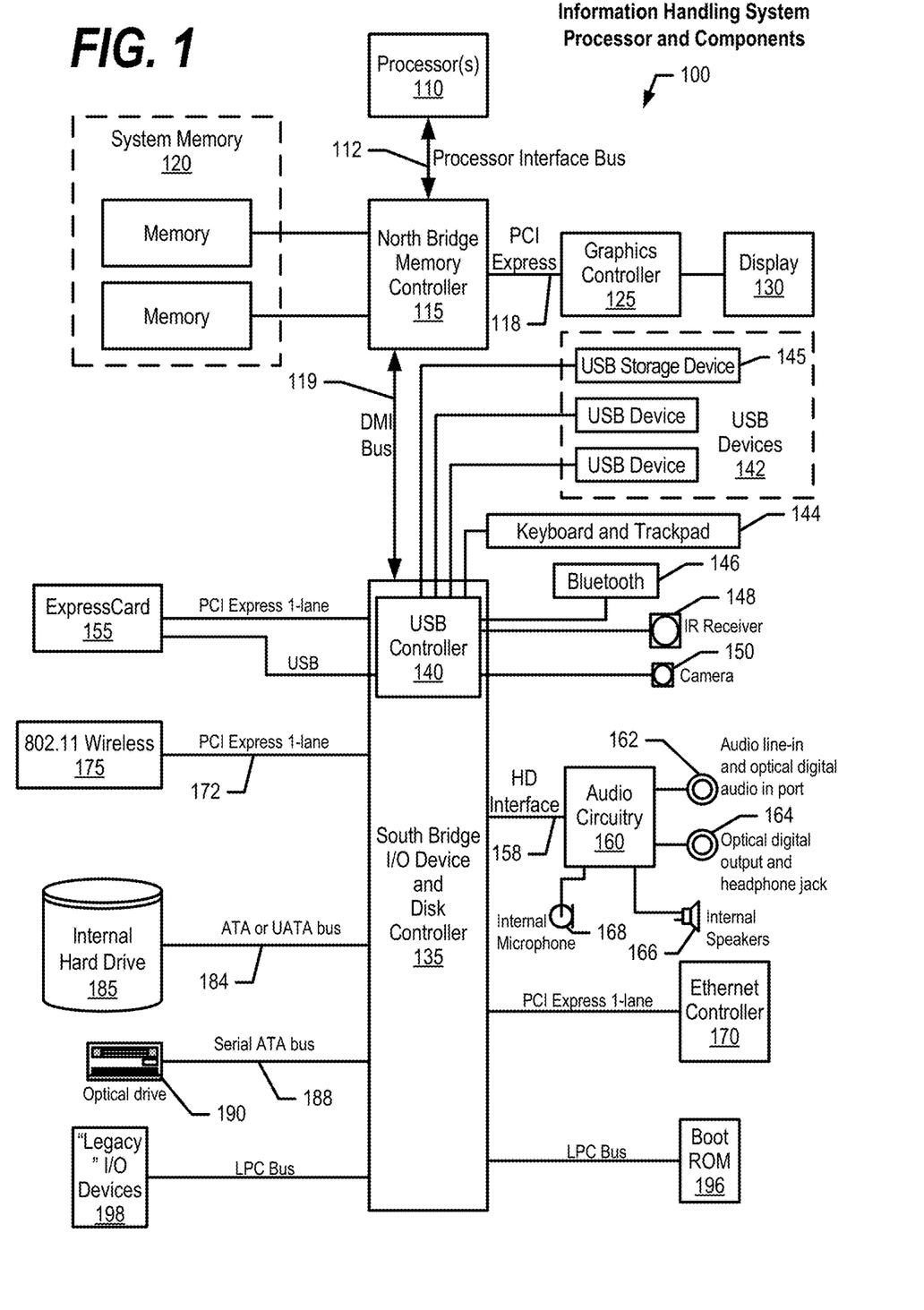
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
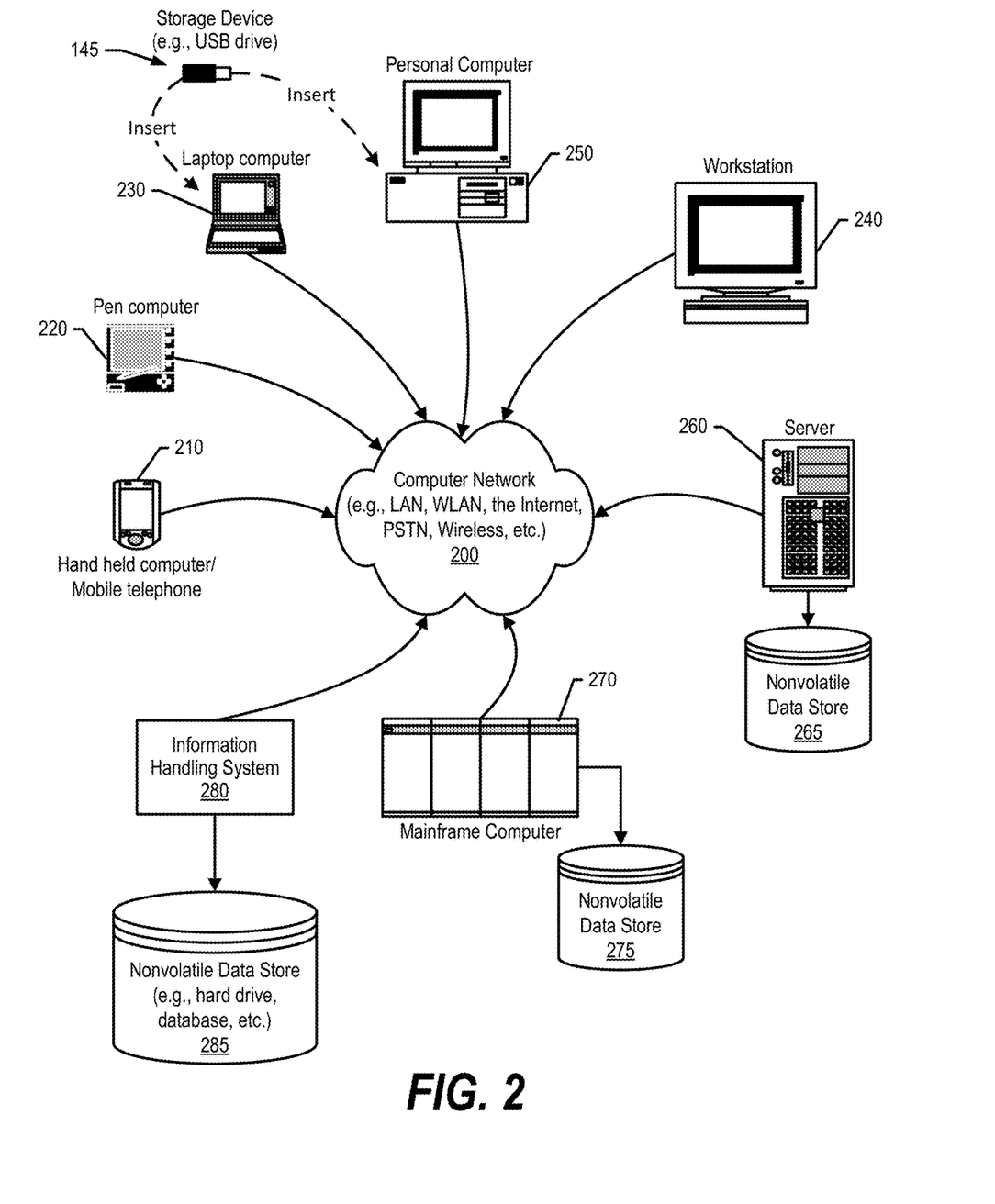
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, in a hyperconverged system, system administrators must know which specific component on a rack to service so as to not disrupt other components. A hyperconverged configuration is not deterministic as compared to the converged systems which come preconfigured. The disparate location of components makes maintenance difficult because locating a component is challenging in a data center where all systems look very similar.

FIGS. 3 through 10 depict an approach that can be executed on an information handling system that registers hardware components to a hyperconverged system, discovers hardware issues in the hyperconverged system, troubleshoots the hardware issues, and informs system administrators of their respective physical locations. The approach combines enhanced image recognition techniques that detect hardware components on a rack, fetches details of the detected components based on scannable mechanisms in the image (visible bar codes, QR codes, etc.), and monitors the health and installation of the hardware components.

In one embodiment, the approach includes a location feature such as global positioning system (GPS) to save the location of each rack and locate each component when maintenance, replacement, or troubleshooting is required. The approach collects and maintains historical data of the components to provide insight into the health of each component and predict expected failures and/or propose solutions to prevent future component failures from occurring.

As discussed below, the approach significantly reduces hardware discovery and configuration time to easily set up hardware components post installation. Furthermore, predictions of possible failures of hardware components prevent customer system outages and avoid unnecessary problem management records (PMR).

Figure 3:
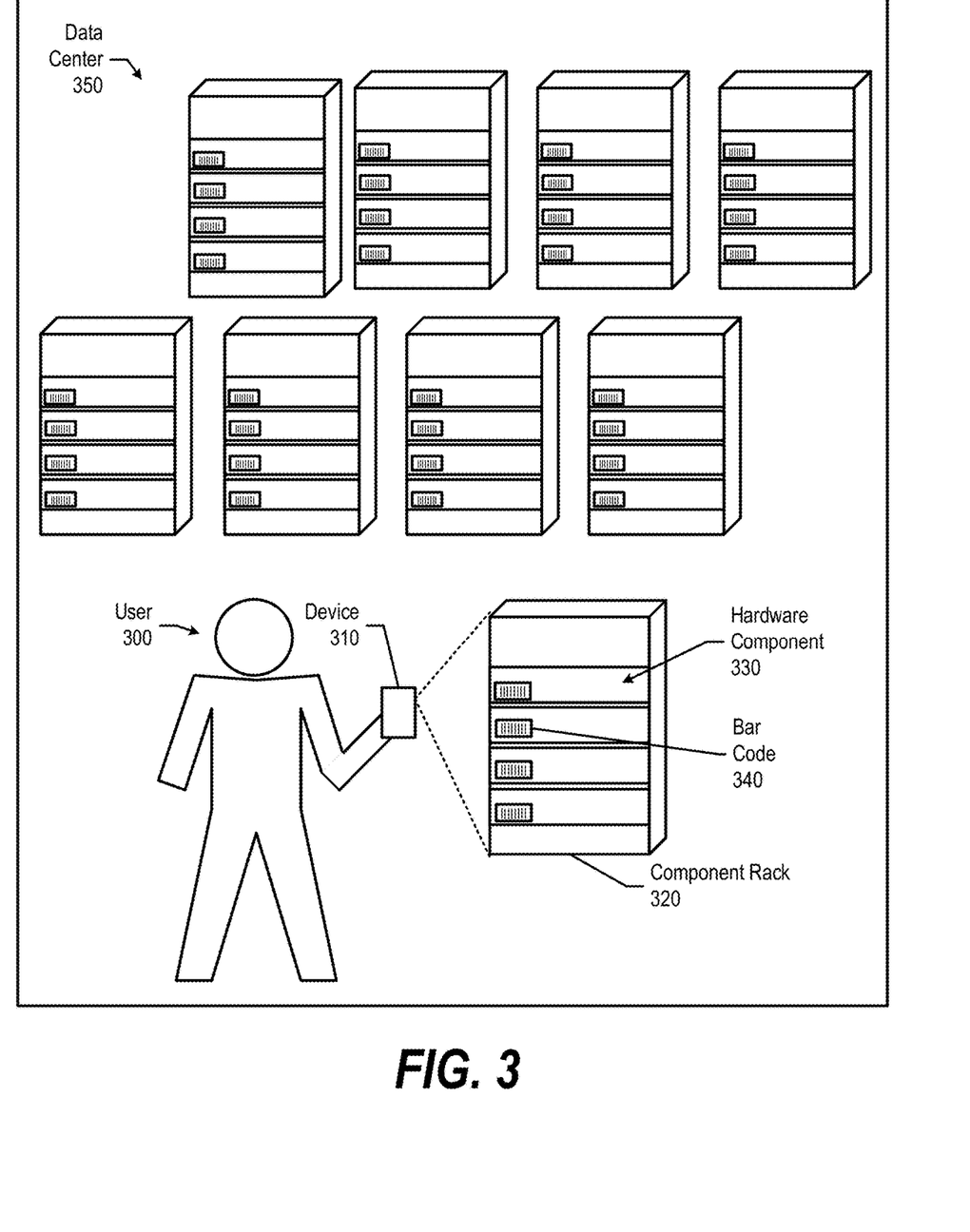
FIG. 3 is an exemplary diagram depicting a user scanning new hardware into hyperconverged system.

FIG. 3 is an exemplary diagram depicting a user scanning new hardware into hyperconverged system. As discussed herein, user 300 uses a hyperconverged system management application on device 310 to provide support and enhance the process to install, discover, monitor, troubleshoot (remotely or manually), and purchase/replace hardware components when necessary.

Device 310 captures an image of component rack 320 and the hyperconverged system management application uses an enhanced image recognition feature to detect a location on component rack 320 that hardware component 330 resides. The hyperconverged system management application fetches details about hardware component 330 based on bar codes detected in the image, such as bar code 340. The application also implements a locator feature that uses GPS to save the location of component rack 320 relative to other racks in data center 350 to help track and locate each component when hardware component 330 requires maintenance or troubleshooting (see FIGS. 8, 10, and corresponding text for further details).

Figure 7:
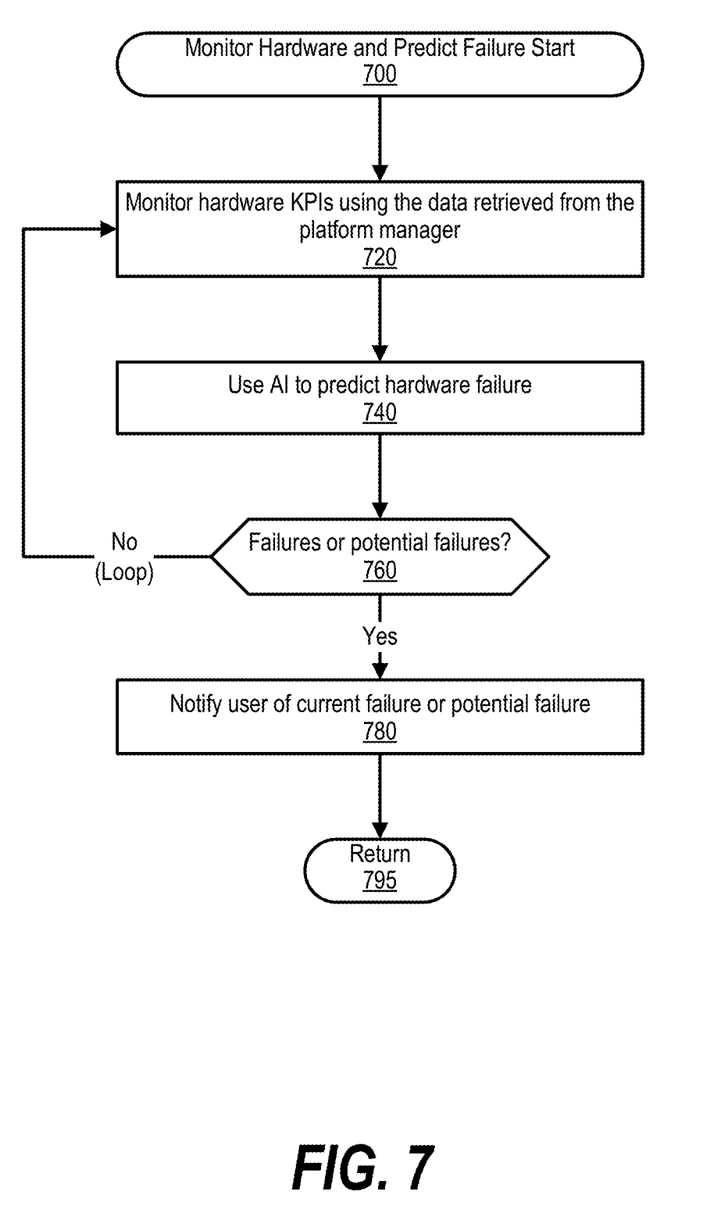
FIG. 7 is an exemplary flowchart showing steps taken to monitor hardware components and predict failures.

Additionally, the hyperconverged system management application facilitates troubleshooting and replacing components when necessary while also collecting relevant data to provide a historical insight on the health of each component and predict when components might experience failures in the future in an attempt to help prevention by the system administrator (see FIG. 7 and corresponding text for further details).

As discussed in more detail below, the hyperconverged system management application improves the efficiency of a system administrator to maintain hardware components in a hyperconverged system. The hyperconverged system management application (i) detects installations of hardware components using enhanced image detection techniques; (ii) discovers and configures new hardware components; (iii) monitors the hardware components; (iv) identifies current failures and predicts future failures; (v) troubleshoots the current failures and future failures; and (vi) recommends replacement/upgraded hardware versions for purchase.

The approach discussed herein includes workflows to generate a virtual layout of a data center and immediately enables monitoring capabilities so that user 300 can access all necessary information to monitor and maintain an infrastructures' health through access to resource usage and predictions (see FIG. 7 and corresponding text for further details). Additionally, the hyperconverged system management application aids the troubleshooting process through remote options as well as instructions for manual options (see FIG. 8 and corresponding text for further details).

Figure 4:
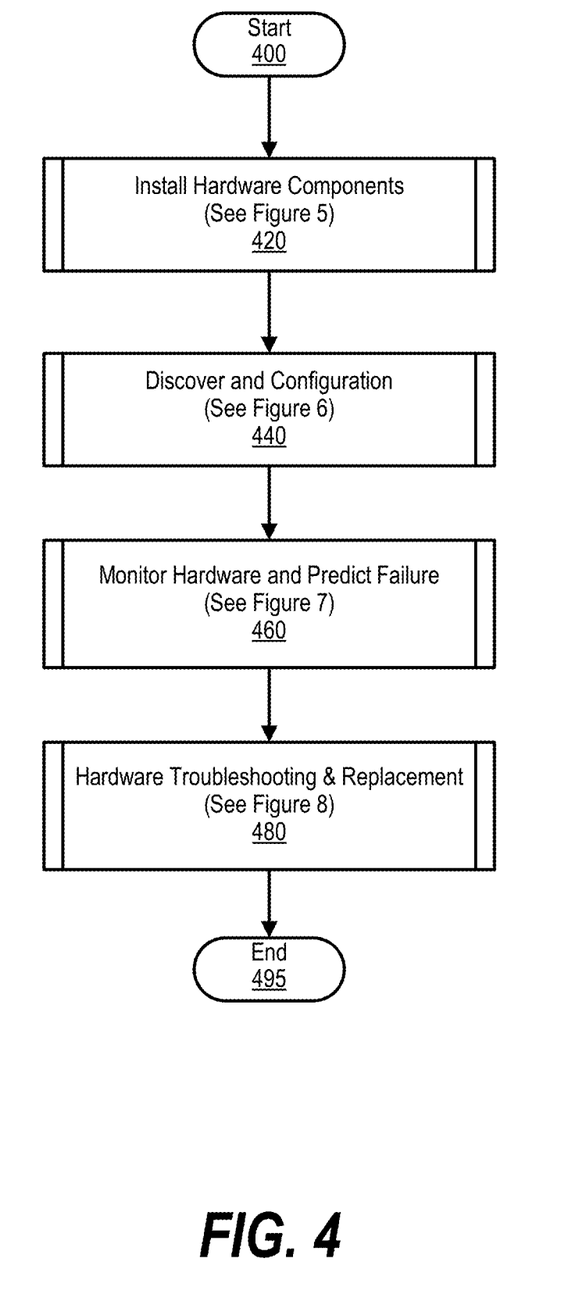
FIG. 4 is an exemplary high level flowchart showing steps taken to perform various steps of managing a hyperconverged system as discussed herein.

FIG. 4 is an exemplary high level flowchart showing steps taken to install hardware components using enhanced image detection techniques; discover and configure new hardware components; monitor the hardware components; identify current failures and predict future failures; troubleshoot the current failures and future failures; and (v) recommend replacement/upgrade hardware versions for purchase.

Figure 5:
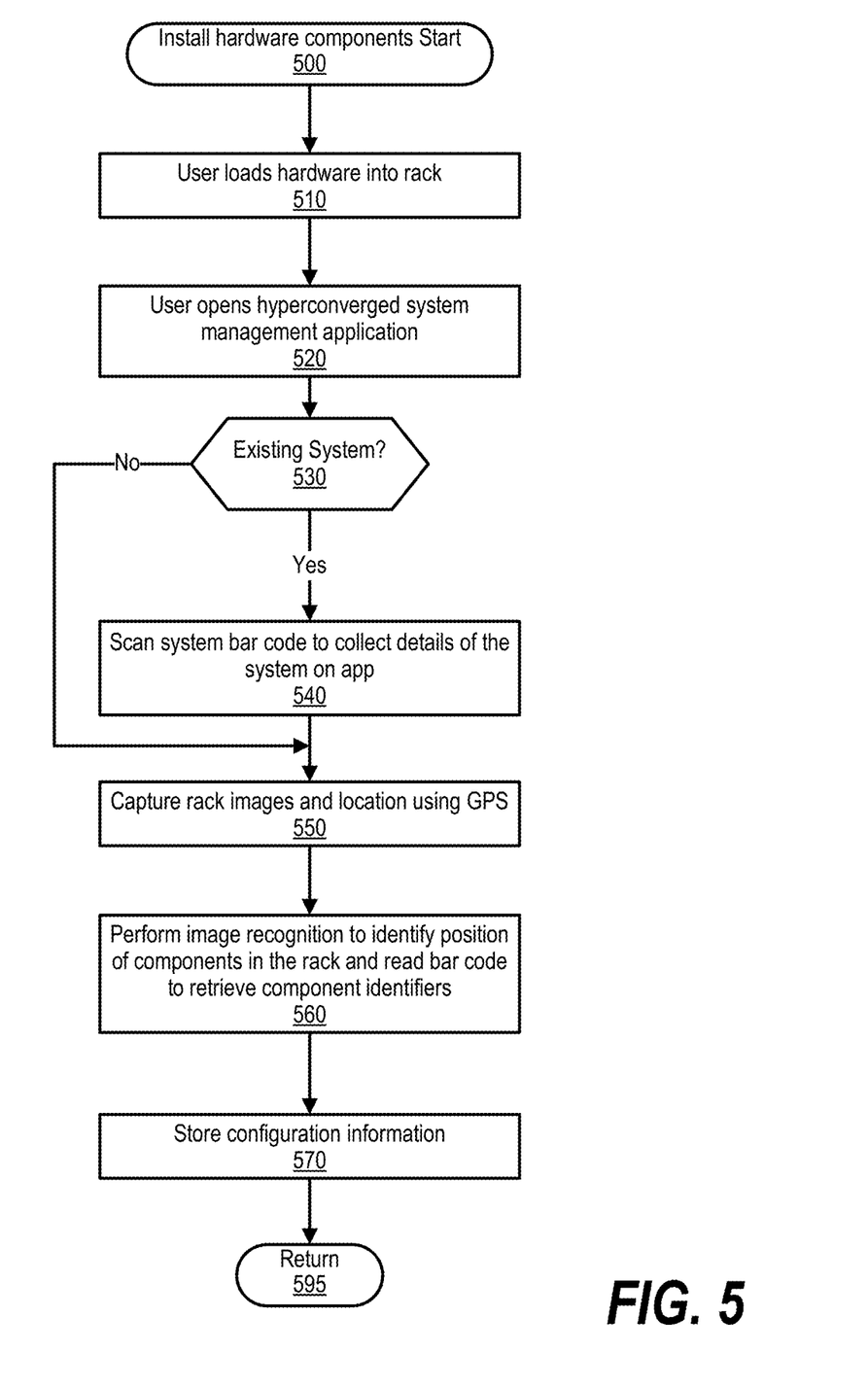
FIG. 5 is an exemplary flowchart showing steps taken to install hardware components in a hyperconverged system.

FIG. 4 processing commences at 400 whereupon, at predefined process 420, the process (e.g., hyperconverged system management application) registers installed hardware components (see FIG. 5 and corresponding text for processing details). In one embodiment, on initial setup, user 300 indicates whether user 300 wishes to install hardware in an existing system or a new system. Once user 300 selects a specific system, user 300 photographs each rack, ensuring that all components within the rack are clearly in view in the photo. If applicable, the process saves a numeric input representing floor number location. If user 300 wishes to grant the application location access, the process automatically saves the current GPS coordinates to save the rack's location and help guide user 300 back to the specific rack when user 300 performs maintenance on any of its components. If user 300 has not provided permission to access its location, user 300 manually inputs the location.

Figure 6:
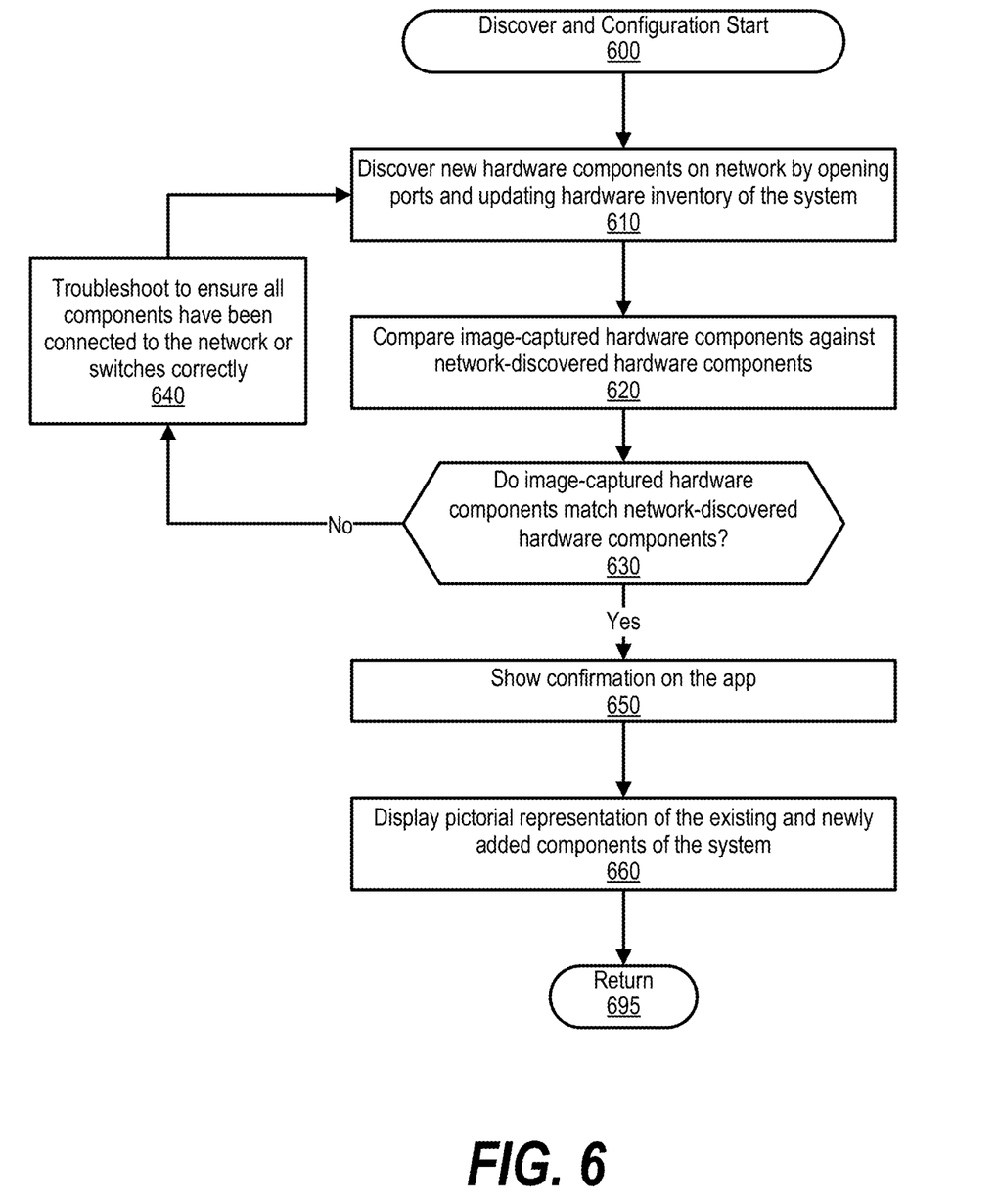
FIG. 6 is an exemplary flowchart showing steps taken to discover and setup a hyperconverged system.

At predefined process 440, the process discovers hardware on the network and configures the hardware (see FIG. 6 and corresponding text for processing details). In this step, user 300 initializes a domain specific discovery process for the process to connect to the components over the network. After the process completes, the process maps the network-discovered hardware components to the image-captured hardware components added from image recognition to verify that all components are successfully discovered through the domain specific process. If the process determines that some components are missing, the process assists user 300 to identify the missing components and facilitates troubleshooting. User 300 ensures that all the components are correctly wired to the network and other hardware components so the components are properly discovered.

At predefined process 460, the process monitors the hyperconverged system's components and identifies hardware components that are failing or are predicted to fail (see FIG. 7 and corresponding text for processing details). In one embodiment, once user 300 has added and discovered all components in the system, the process monitors each component and assists user 300 to maintain the hyperconverged system's health (see FIG. 10 and corresponding text for further details). At predefined process 480, the process performs hardware troubleshooting and replacement steps on the identified hardware components (see FIG. 8 and corresponding text for processing details). FIG. 4 processing thereafter ends at 495.

FIG. 5 is an exemplary flowchart showing steps taken to install hardware components in a hyperconverged system. FIG. 5 processing commences at 500 whereupon, at step 510, a user (e.g., installer, user 300, etc.) loads hardware components into a rack. At step 520, a user (e.g., system administrator, user 300, etc.) opens an application, such as a hyperconverged system management application, on device 310.

The process (hyperconverged system management application) determines as to whether the system is an existing system (decision 530). For example, user 300 may select an existing system or "add new" on a user interface window (see FIG. 9 and corresponding text for further details).

If the system is not an existing system, then decision 530 branches to the 'no' branch bypassing step 540. On the other hand, if the system is an existing system, then decision 530 branches to the 'yes' branch whereupon, at step 540, the process scans a system bar code to collect details of the system, such as on a work order.

At step 550, the process captures rack images and locations using GPS, for example. At step 560, the process performs image recognition to identify the position of components in the rack and read bar codes to retrieve component identifiers. In one embodiment, on each rack, each component belonging to a hyperconverged system displays a bar code that is clearly visible in the image. The image recognition feature analyzes these codes to identify each component belonging to the hyperconverged system for which the monitoring system should collect status and metrics data. At step 570, the process stores the configuration information and FIG. 5 processing thereafter returns to the calling routine (see FIG. 4) at 595.

In one embodiment, user 300 expands the hyperconverged system infrastructure with additional hardware components to increase its resources. In this embodiment, if user 300 adds components to an already existing rack, user 300 selects the specific rack and the hyperconverged system management application provides the option to retake photos (see FIG. 9 and corresponding text for further details). The image recognition feature then identifies any new components on the rack, along with their position within the rack, and adds them to the current inventory of components monitored on the process. User 300 may also choose to add components to a new rack not yet being tracked on the process, in which case user 300 adds a photo of the rack so that the process saves its location and identifies each component within the rack along with their positions within the rack.

FIG. 6 is an exemplary flowchart showing steps taken to discover and configure a hyperconverged system. FIG. 6 processing commences at 600 whereupon, at step 610, the process discovers new hardware components on a computer network by opening ports and updating hardware inventory of the system. At step 620, the process compares the image-captured hardware components from FIG. 5 with the network-discovered hardware components. In one embodiment, the process ties the image recognition and discovery process together. In this embodiment, once the discovery of components is done, the process compares what was detected through image recognition with what the discovery process detected. If the discovery process has less than what was detected during image recognition, then the process notifies the user that a particular component may be incorrectly wired. The user can then troubleshoot and reinitiate the discovery process or proceed without the missing component.

The process determines as to whether all of the image-captured hardware components match the network-discovered hardware components and vice versa (decision 630). In one embodiment, when hardware components are discovered but an image doesn't exist, an installer can drag and drop the image as per a wireframe to manually specify the system to which the hardware component belongs. In another embodiment, when an image exists but no matching hardware was discovered, the installer ensures that all the components are correctly wired and re-initiates the discovery process.

If there is a matching discrepancy, then decision 630 branches to the 'no' branch which loops back to troubleshoot the system to ensure all components have been connected to the network or switches correctly (step 640). This looping continues until each component matches an image and vice versa, at which point decision 630 branches to the yes' branch exiting the loop.

At step 650, the process shows a confirmation on the hyperconverged system management application. At step 660, the process displays a pictorial representation of the existing components and newly added components of the system (see FIG. 10 and corresponding text for further details). FIG. 6 processing thereafter returns to the calling routine (see FIG. 4) at 695.

FIG. 7 is an exemplary flowchart showing steps taken to monitor hardware components and predict failures. FIG. 7 processing commences at 700 whereupon, at step 720, the process monitors hardware key performance indicators (KPIs) using data retrieved from a platform manager. At step 740, the process uses artificial intelligence (AI) to predict hardware failures.

In one embodiment, the process analyzes trends and detects whether a dangerous trend is forming, such as the temperature is about to be too high, CPU usage is close to 100%, etc. The process uses historical system data to predict how trends might change in the near future and assist user 300 in determining whether to be concerned.

In another embodiment, when hardware components fail, the process captures the conditions at the time of the failure such as the system temperature, the CPU usage, and the version and type of component. The process then feeds the information to a machine learning algorithm so that when the process finds the system in the future in a similar state, the process generates an alert to check the system.

The process determines as to whether there are hardware failures or potential hardware failures (decision 760). If there are no failures or potential failures, then decision 760 branches to the 'no' branch which loops back to continue to monitor the system. This looping continues until there is a failure or potential failure, at which point decision 760 branches to the 'yes' branch exiting the loop. At step 780, the process notifies the system administrator (user 300) that a hardware component is going to fail or has failed. FIG. 7 processing thereafter returns to the calling routine (see FIG. 4) at 795.

Figure 8:
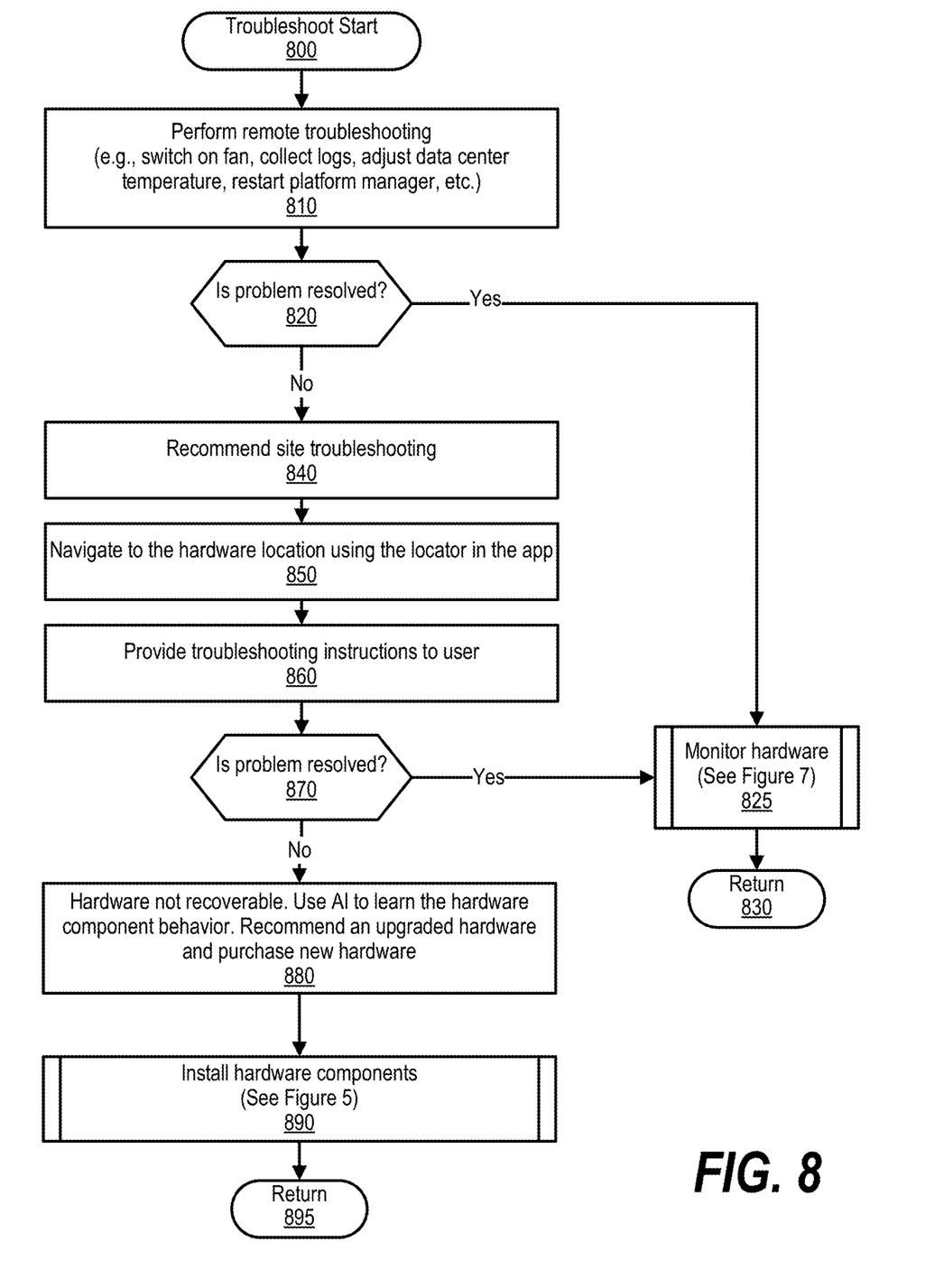
FIG. 8 is an exemplary flowchart showing steps taken to troubleshoot hardware and recommend replacement hardware.

FIG. 8 is an exemplary flowchart showing steps taken to troubleshoot hardware and recommend replacement hardware. FIG. 8 processing commences at 800 whereupon, at step 810, the process performs remote troubleshooting (e.g., switch on fan, collect logs, adjust data center temperature, restart platform manager, etc.). In one embodiment, when the process identifies a problem, user 300 selects the component and the process "drills down" to the component to reveal information about any errors it is experiencing, along with any known processes running on it and corresponding resource usage data (see FIG. 10 and corresponding text for further details).

The process determines as to whether the problem is resolved (decision 820). If the problem is resolved, then decision 820 branches to the 'yes' branch whereupon, at step 825, the process monitors the hardware (See FIG. 7 and corresponding text for further details). FIG. 8 processing thereafter returns to the calling routine (see FIG. 4) at 830.

On the other hand, if the problem is not resolved, then decision 820 branches to the 'no' branch whereupon, at step 840, the process indicates to user 300 to perform site troubleshooting. At step 850, the process assists user 300 to navigate to the hardware location based on configuration information obtained in step 550 of FIG. 5. At step 860, the process provides troubleshooting instructions to user 300.

The process determines as to whether the problem is resolved (decision 870). If the problem is resolved, then decision 870 branches to the 'yes' branch whereupon, at step 825, the process monitors the hardware components (See FIG. 7 and corresponding text for further details).

On the other hand, if the problem is not resolved, then decision 870 branches to the 'no' branch. At step 880, the process determines that the hardware is not recoverable and uses artificial intelligence to learn the hardware component behavior. The process may also recommend an upgraded hardware and to purchase new hardware. In one embodiment, the process captures information about component version, features, and reasons for failure from similar systems and uses the information to learn behaviors and recommend possible upgrades to higher versions or to purchase new hardware.

At step 890, when the hardware is ready to install, the process assists user 300 to install the hardware components (See FIG. 5) and begins monitoring the system again. FIG. 8 processing thereafter returns to the calling routine (see FIG. 4) at 895.

Figure 9:
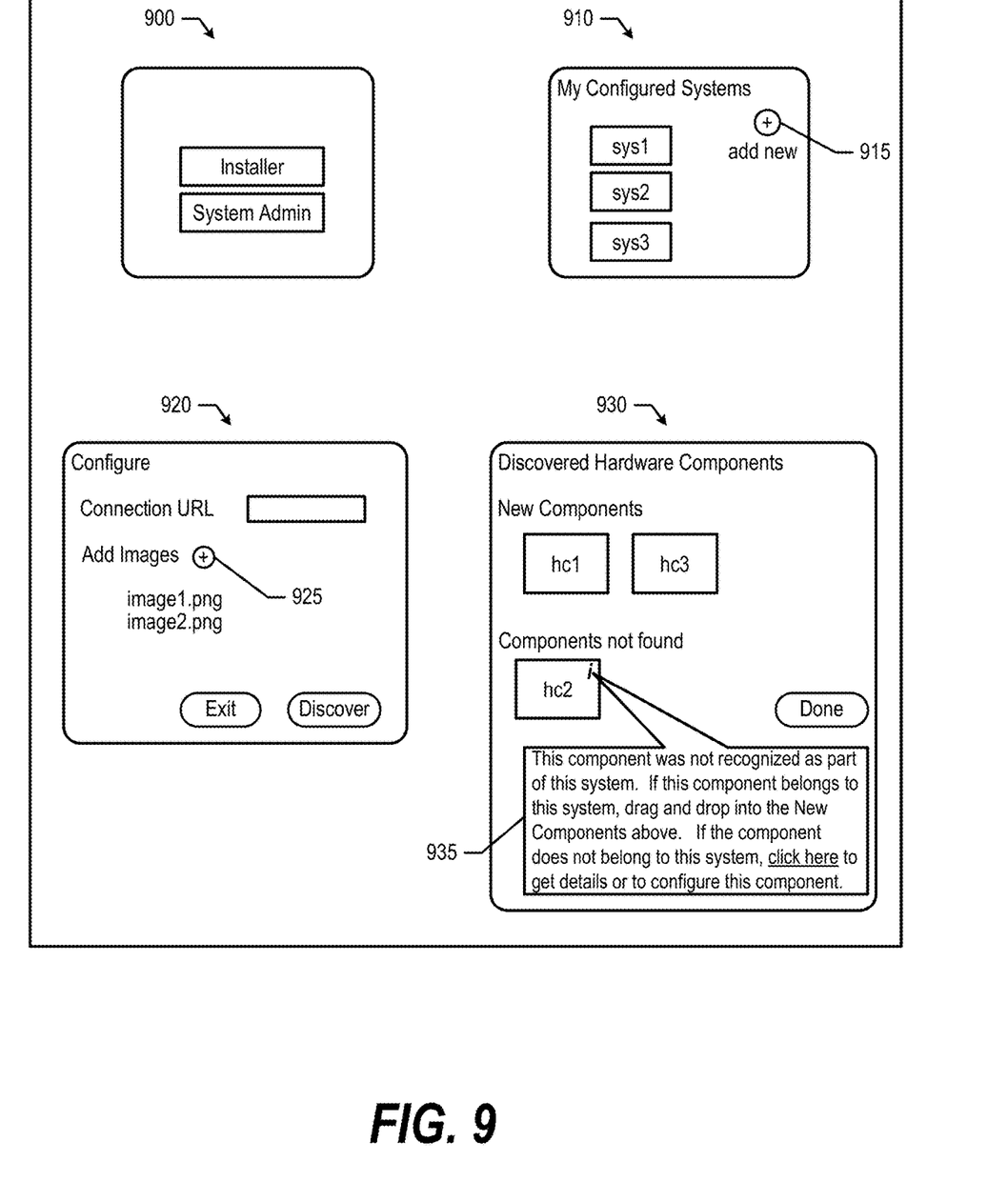
FIG. 9 shows exemplary user interface windows to assist a user to configure a hyperconverged system.

FIG. 9 shows exemplary user interface windows to assist a user to configure a hyperconverged system. A hyperconverged system management application displays window 900 on device 310. In one embodiment, window 900 is a top-level window for user 300 to select an Installer or a System Administrator. When user 300 selects "Installer," hyperconverged system management application displays window 910, which allows user 300 to select an existing system or add a new system (button 915).

When user 300 selects a new or existing system, the hyperconverged system management application displays window 920, which allows user 300 to add images specific to the selected system (button 925). Window 930 shows new components that are found during the discovery process (hci1, hci3) as well as components that are not found (unmatched) (hci2). In one embodiment, the unfound components may be network discovered components that do not have a matching image, or may be images that do not have a matching component discovered on the network. Window 930 shows info 935 that provides user 300 with information about the unfound component and steps that may be performed.

Figure 10:
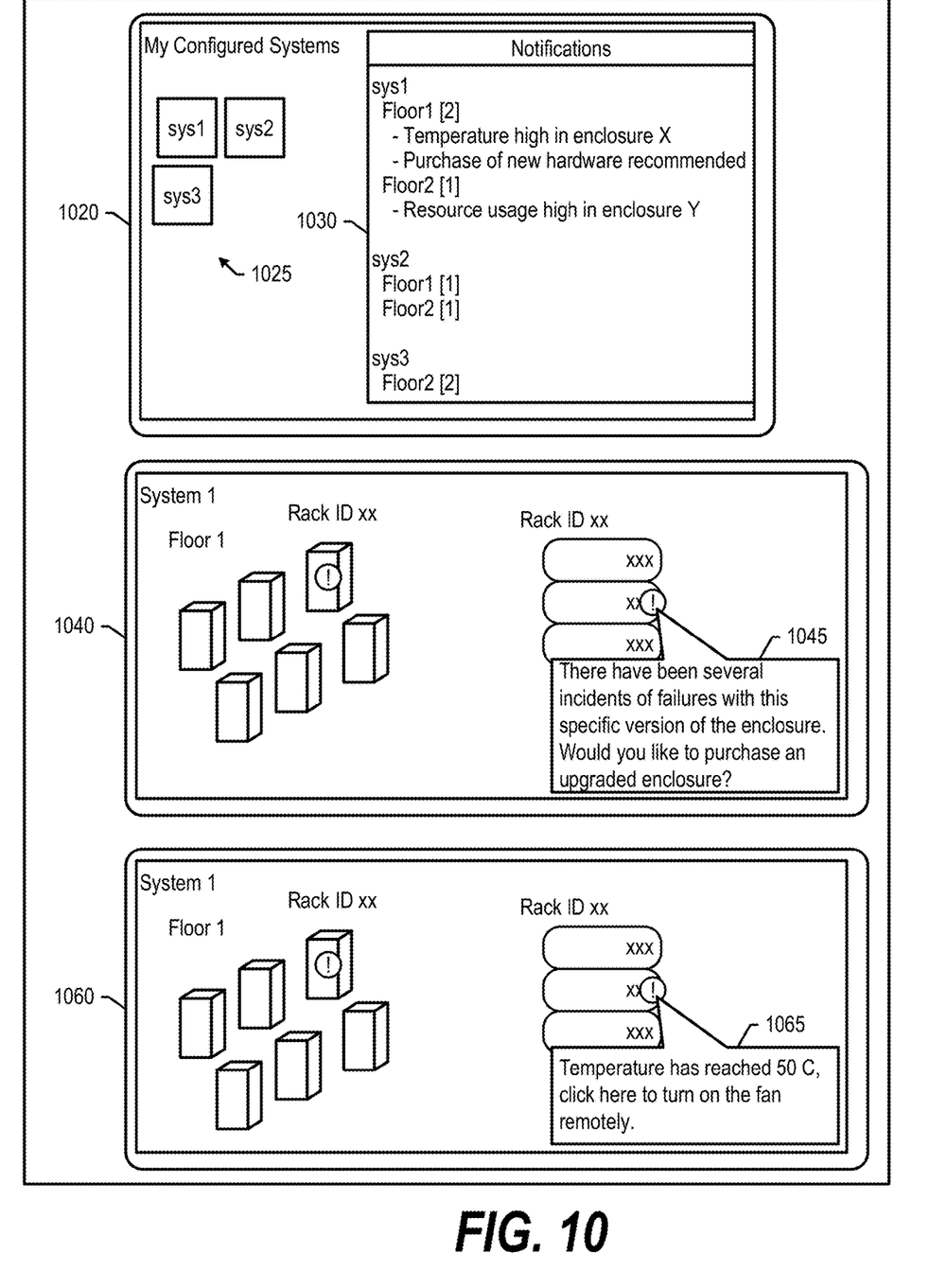
FIG. 10 shows exemplary user interface windows that assist a user to troubleshoot a hyperconverged system.

FIG. 10 shows exemplary user interface windows that assist a user to troubleshoot a hyperconverged system. Window 1020 includes section 1025 (shows configured systems) and notification panel 1030. Notification panel 1030 shows alerts for each system dispersed across different floors. Selecting an alert in the notification panel provides user 300 with a short description of the alert (window 1040). In one embodiment, window 1040 provides hardware failure predictions and recommendations (1045).

Selecting the alert provides user 300 with a floor view of the hyperconverged system (window 1060). In one embodiment, window 1060 utilizes enhanced software to graphically represent the hardware where user 300 can drill down to view the details for each component.

In one embodiment, when the hyperconverged system management application displays warning 1065 for the component, the hyperconverged system management application may have recognized resource usage approaching a dangerous limit, or may have used machine learning based on historical resource usage data collected and previous failures to predict that a failure may occur in the near future. The hyperconverged system management application uses metrics data collection to correlate resource usage to failures detected on the various components. If the current state of the hyperconverged system is similar to a previous state which leads to component failures, the hyperconverged system management application uses this information to warn user 300 of a potential failure.

In another embodiment, if a hardware component is experiencing an error, the hyperconverged system management application accesses the corresponding error code and provides user 300 instructions to troubleshoot the given error. If there are actionable items user 300 can perform without having to physically locate the component, the hyperconverged system management application includes the option to complete the actions, such as run relevant configuration scripts if the hyperconverged system management application determines the issue is a faulty configuration, or to turn on a fan if temperature has risen.

In another embodiment, if troubleshooting requires user 300 to physically perform provided instructions, the hyperconverged system management application utilizes a locator to direct user 300 towards the rack that houses the component. Once user 300 has found the rack, user 300 has an option to light an LED attached to each component so that user 300 can easily identify exactly which component on the physical rack user 300 should troubleshoot. After user 300 has performed the instructions, the hyperconverged system management application clears the error if it detects that the issue has been fixed. If after completing the troubleshooting instructions, however, the component is still experiencing issues and user 300 determines the component cannot be fixed, the hyperconverged system management application provides replacement options and facilitates the ordering process as well as the replacement process once the replacement component arrives.

In another embodiment, the hyperconverged system management application prompts the user for feedback on whether the provided instructions helped resolve the issue. The feedback is then utilized to determine which troubleshooting suggestions are best to recommend for future failures.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   capturing an image and a physical location of a component rack comprising a set of hardware components, wherein the set of hardware components are part of a hyperconverged system;
   discovering the set of hardware components on a computer network during a domain-specific discovery process;

monitoring a status of the set of hardware components in response to verifying each one of the set of hardware components captured in the image matches one of the discovered set of hardware components;
predicting a failure of a first one of the set of hardware components during the monitoring of the status of the set of hardware components, wherein the predicting comprises:
  analyzing a set of current environmental conditions against a set of historical data corresponding to the first one of the set of hardware components; and
  in response to the analyzing, determining that a trend is forming, wherein the trend indicates a failure is imminent;
in response to predicting the failure, performing one or more remote troubleshooting activities;
in response to performing the remote troubleshooting activities, determining that the failure is still imminent; and
in response to determining that the failure is still imminent, navigating a user to the physical location of the component rack and providing the user with one or more site troubleshooting instructions.

2. The method of claim 1 wherein each of the set of hardware components comprises a bar code that is visible in the image and identifies it as one of the set of hardware components.

3. The method of claim 2 further comprising:
collecting a set of identification information of each of the set of hardware components based on their corresponding bar code; and
registering the set of hardware components to the hyperconverged system based on their corresponding set of identification information.

4. The method of claim 3 further comprising:
adding one or more additional hardware components to the component rack, wherein the one or more additional hardware components comprise one or more different bar codes;
capturing a different image of the component rack that comprises the one or more additional hardware components;
collecting a set of different identification information of each of the one or more different hardware components based on their corresponding one or more different bar codes; and
registering the set of different hardware components to the hyperconverged system based on their corresponding set of different identification information.

5. The method of claim 3 further comprising:
storing a set of location information of the set of hardware components during the registering of the set of hardware components, wherein the set of location information includes the physical location of the component rack;
detecting a failure of a second one of the set of hardware components during the monitoring of the status of the set of hardware components; and
informing the user of the failure, wherein the informing comprises providing the set of location information to the user.

6. The method of claim 5 further comprising:
ordering a replacement hardware component of the failed hardware component; and
informing the user of the ordered replacement hardware component.

7. An information handling system comprising:
one or more processors;
a memory coupled to at least one of the processors;
a set of computer program instructions stored in the memory and executed by at least one of the processors in order to perform actions of:
  capturing an image and a physical location of a component rack comprising a set of hardware components, wherein the set of hardware components are part of a hyperconverged system;
  discovering the set of hardware components on a computer network during a domain-specific discovery process;
  monitoring a status of the set of hardware components in response to verifying each one of the set of hardware components captured in the image matches one of the discovered set of hardware components;
  predicting a failure of a first one of the set of hardware components during the monitoring of the status of the set of hardware components, wherein the predicting comprises:
    analyzing a set of current environmental conditions against a set of historical data corresponding to the first one of the set of hardware components; and
    in response to the analyzing, determining that a trend is forming, wherein the trend indicates a failure is imminent;
  in response to predicting the failure, performing one or more remote troubleshooting activities;
  in response to performing the remote troubleshooting activities, determining that the failure is still imminent; and
  in response to determining that the failure is still imminent, navigating a user to the physical location of the component rack and providing the user with one or more site troubleshooting instructions.

8. The information handling system of claim 7 wherein each of the set of hardware components comprises a bar code that is visible in the image and identifies it as one of the set of hardware components.

9. The information handling system of claim 8 wherein the processors perform additional actions comprising:
collecting a set of identification information of each of the set of hardware components based on their corresponding bar code; and
registering the set of hardware components to the hyperconverged system based on their corresponding set of identification information.

10. The information handling system of claim 9 wherein the processors perform additional actions comprising:
adding one or more additional hardware components to the component rack, wherein the one or more additional hardware components comprise one or more different bar codes;
capturing a different image of the component rack that comprises the one or more additional hardware components;
collecting a set of different identification information of each of the one or more different hardware components based on their corresponding one or more different bar codes; and
registering the set of different hardware components to the hyperconverged system based on their corresponding set of different identification information.

11. The information handling system of claim 9 wherein the processors perform additional actions comprising:

storing a set of location information of the set of hardware components during the registering of the set of hardware components, wherein the set of location information includes the physical location of the component rack;

detecting a failure of a second one of the set of hardware components during the monitoring of the status of the set of hardware components; and informing the user of the failure, wherein the informing comprises providing the set of location information to the user.

12. The information handling system of claim 11 wherein the processors perform additional actions comprising:

ordering a replacement hardware component of the failed hardware component; and informing the user of the ordered replacement hardware component.

13. A computer readable storage medium having a computer program product stored thereon, the computer program product comprising computer program code that, when executed by an information handling system, causes the information handling system to perform actions comprising:

capturing an image and a physical location of a component rack comprising a set of hardware components, wherein the set of hardware components are part of a hyperconverged system;

discovering the set of hardware components on a computer network during a domain-specific discovery process;

monitoring a status of the set of hardware components in response to verifying each one of the set of hardware components captured in the image matches one of the discovered set of hardware components;

predicting a failure of a first one of the set of hardware components during the monitoring of the status of the set of hardware components, wherein the predicting comprises:

analyzing a set of current environmental conditions against a set of historical data corresponding to the first one of the set of hardware components; and in response to the analyzing, determining that a trend is forming, wherein the trend indicates a failure is imminent;

in response to predicting the failure, performing one or more remote troubleshooting activities;

in response to performing the remote troubleshooting activities, determining that the failure is still imminent; and in response to determining that the failure is still imminent, navigating a user to the physical location of the component rack and providing the user with one or more site troubleshooting instructions.

14. The computer readable storage medium of claim 13 wherein each of the set of hardware components comprises a bar code that is visible in the image and identifies it as one of the set of hardware components.

15. The computer readable storage medium of claim 14 wherein the information handling system performs further actions comprising:

collecting a set of identification information of each of the set of hardware components based on their corresponding bar code; and registering the set of hardware components to the hyperconverged system based on their corresponding set of identification information.

16. The computer readable storage medium of claim 15 wherein the information handling system performs further actions comprising:

adding one or more additional hardware components to the component rack, wherein the one or more additional hardware components comprise one or more different bar codes;

capturing a different image of the component rack that comprises the one or more additional hardware components;

collecting a set of different identification information of each of the one or more different hardware components based on their corresponding one or more different bar codes; and registering the set of different hardware components to the hyperconverged system based on their corresponding set of different identification information.

17. The computer readable storage medium of claim 15 wherein the information handling system performs further actions comprising:

storing a set of location information of the set of hardware components during the registering of the set of hardware components, wherein the set of location information includes the physical location of the component rack;

detecting a failure of a second one of the set of hardware components during the monitoring of the status of the set of hardware components; and informing the user of the failure, wherein the informing comprises providing the set of location information to the user.

* * * * *